(12) United States Patent
Terry et al.

(10) Patent No.: US 6,502,075 B1
(45) Date of Patent: Dec. 31, 2002

(54) AUTO ATTENDANT HAVING NATURAL NAMES DATABASE LIBRARY

(75) Inventors: Kim S. Terry, Plano, TX (US); Peter J. Foster, Dallas, TX (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/276,928

(22) Filed: Mar. 26, 1999

(51) Int. Cl.$^7$ ............................................... G10L 17/00
(52) U.S. Cl. ........................................ 704/275; 704/255
(58) Field of Search ................................ 704/260, 258, 704/270, 275, 257, 255, 270.1; 379/70, 214, 88.01, 88.02, 88.04, 88.1, 88.11, 88.12, 88.16, 88.18, 88.23, 88.28

(56) References Cited

U.S. PATENT DOCUMENTS

| | | | | |
|---|---|---|---|---|
| 5,210,520 A | * | 5/1993 | Housley | 340/326 |
| 5,483,579 A | * | 1/1996 | Stoged | 379/88 |
| 5,651,055 A | * | 7/1997 | Argade | 379/88 |
| 5,794,249 A | * | 8/1998 | Orsolini et al. | 707/104 |
| 5,875,448 A | * | 2/1999 | Boys et al. | 707/531 |
| 5,892,814 A | * | 4/1999 | Brisebois et al. | 379/88.24 |
| 6,021,181 A | * | 2/2000 | Miner et al. | 379/88.23 |
| 6,041,300 A |   | 3/2000 | Ittycheriah et al. | 704/255 |
| 6,075,844 A | * | 6/2000 | Goldberg et al. | 379/88.17 |
| 6,088,428 A | * | 7/2000 | Trandal et al. | 379/88.02 |
| 6,173,266 B1 | * | 1/2001 | Marx et al. | 704/270 |

* cited by examiner

Primary Examiner—Richemond Dorvil
(74) Attorney, Agent, or Firm—Daniel J. Piotrowski

(57) ABSTRACT

An automated telephone operator platform (e.g., an auto attendant) has a natural names library associated therewith. The natural names library comprises a large database of audio files representing common objects expected to be recognized by a telephone-based ASR application associated with or executing on the platform. Whenever the ASR application requires playback of an object file (e.g., a user's name associated with a mailbox), the system first determines whether the user has recorded a sample of his or her own voice. If so, the user's actual voice sample is output. If, however, the user's actual voice sample is not available or has not been recorded, the ASR application accesses the database to retreive objects files from which it then builds an appropriate output string.

18 Claims, 3 Drawing Sheets

AUTO ATTENDANT HAVING NATURAL NAMES DATABASE LIBRARY

BACKGROUND OF THE INVENTION

1. Technical Field

The present invention relates generally to applications for automatic speech recognition (ASR) and, in particular, to automated telephone operator platforms that use ASR for information retrieval, playback and navigation.

2. Description of the Related Art

Conventional voice mail systems have the capability of recording a user's voice for playback and announcement purposes. Thus, for example, when a given called party is not available, the system may be controlled to play a prompt in the called party's actual voice. This operation typically is accomplished by storing a user-recorded audio file and then retrieving that file upon a given occurrence. While the above-described playback technique is desirable, in practice many users do not take the time to record their voice information. Indeed, in some environments, such as the use of such systems in hospitals or hotels, users do not require access to the system for extended periods and, thus, they have no incentive to record their voice information into the system. In these cases, playback of user identifying information can only be accomplished in one of two ways. Either the operator has to undertake the task of recording the user names individually, which may be quite labor intensive, or the system is forced to default to some other means of announcing the user's name. Typically, the default operation is performed by a text-to-speech processor, which provides unacceptable results. In particular, text-to-speech processors cannot provide accurate pronouncements of given names, especially with respect to names of foreign origin.

The present invention addresses this problem.

BRIEF SUMMARY OF THE INVENTION

It is an object of the present invention to provide an automated telephone operator platform (e.g., an auto attendant) that has a natural names library associated therewith. The natural names library comprises a large database of audio files representing common objects (e.g., names, product identifiers, colors, etc.) that are expected to be recognized by a telephone-based ASR application associated with or executing on the platform. Preferably, individual audio files are stored in a compressed format. Whenever the ASR application requires playback of an object file (e.g., the user's name), the system first determines whether the user has recorded the necessary voice sample. If so, the user's actual voice sample is output. If, however, the user's actual voice sample is not available or has not been recorded, the ASR application accesses the database to retreive objects files from which it then builds an appropriate output string.

Thus, for examaple, if a calling party desires to speak with "Mary Smith" and that person is not available, the voice mail system may respond "your call to 'Mary Smith' cannot be completed, if you'd like to leave a message, press 1." In that message, if the 'Mary Smith' prompt does not exist in the user's own voice, the system retrieves 'Mary' and 'Smith', two separate object entries in the common names library, concatenates the objects, and outputs 'Mary Smith'. In the event the available library objects are not available or are insufficient, a text-to-speech processor may be used as a back-up announcement mechanism.

The natural names library may be centrally-located and accessed by a set of attendant platforms via a data network such as the Internet, an intranet, or the like. The library may be accessed on a call-by-call basis, or a subset of objects in the library may be downloaded to a given attendant platform. As the number of entries in the database grows larger and larger, centralized management and administration of the libary is preferred.

Thus, according to the preferred embodiment of the invention, individual component objects of a desired output are retreived from the names library and reassembled (typically by concatenation) into an output. The names library has particular utility as a front end or back end to a private branch exchange to provide directory assistance, voice mail routing, and the like.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
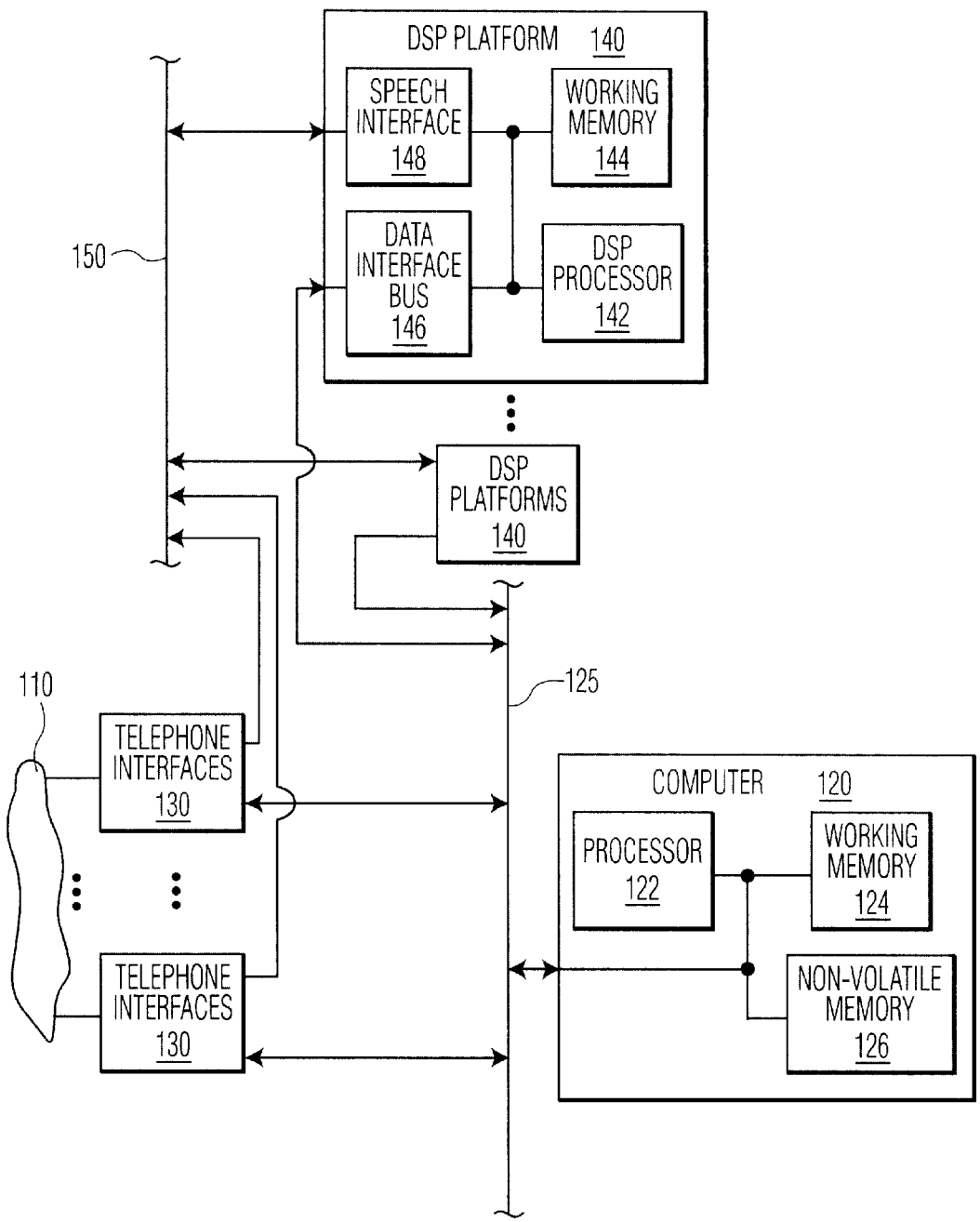
FIG. 1 is a block diagram of a multiprocessor computer for recognizing speech input from multiple telephone lines.

It is known in the prior art to apply speech recognition to telephone based input. By way of background, a known computer architecture on which the present invention may be implemented is illustrated in FIG. 1. The computer 100 is used to interact by voice with callers over multiple telephone lines 110. Computer 100 automatically recognizes what the callers say, and can play prompts to interact with the callers. Computer 100 includes one or more telephone interfaces 130 coupled to a general purpose computer 120, such as a single board computer, over a data bus 125. General purpose computer 120 includes a general purpose processor 122, working memory 124, such as DRAM, and non-volatile program memory 126, such as a magnetic disk. Alternatively, program memory can reside on another computer and be accessed over a data network. Telephone interfaces 130 provide an interface to telephone lines 110 over which callers interact with the computer. Also coupled to general purpose computer 120 over data bus 125 are one or more DSP platforms 140. DSP platforms 140 are coupled to telephone interfaces over a second bus 150, which is preferably a TDM bus. TDM bus 150 can carry digitized speech between DSP platforms 140 and telephone interfaces 130. Each DSP platform 140 includes multiple DSP processors 142, working memory 144, a data bus interface 146 to data bus 125, and a speech interface 148 to data bus 150. General purpose processor is 122 is an Intel Pentium, data 125 is an ISA bus, DSP platform 140 is an Antares DSP platform (Model 2000/30, 2000/50 or 6000) manufactured by Dialogic Corporation, and TDM bus 150 is an SCSI bus that carries telephone signal encoded as 8-bit samples sampled at a 8 kHz sampling rate. Each Antares DSP platform includes four DSP processors 142, TMS320C31 processors manufactured by Texas Instruments. Working memory 144 includes 512 KB of static RAM per DSP and 4MB of dynamic RAM shared by the four DSP processors 142. Telephone interfaces 130 are of any of several different types, e.g., interfaces manufactured by Dialogic Corporation (Model Nos. D41ESC, D160SC, and D112SC). A D112SC interface, for example, supports twelve analog telephone lines 110. Each DSP processor on the DSP platform preferably is associated with a given telephone channel.

In many speech-based telephone applications, a caller is talking for only a relatively small fraction of the time of a telephone call. The remainder of the time is consumed by playing prompts or other information to the caller, or by quiet intervals, for example, while information is being retrieved for the caller. Thus, if desired, one DSP may be allocated for each telephone interaction, regardless of whether a caller is talking, or a prompt or information is being played.

Figure 2:
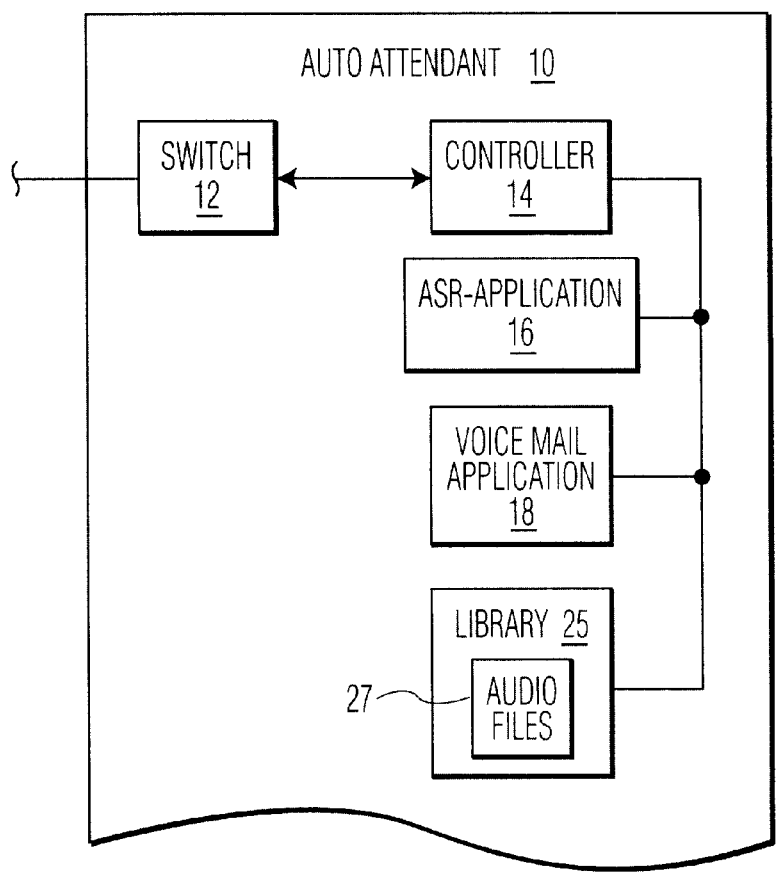
FIG. 2 is a simplified block diagram of one preferred implementation of the present invention in conjunction with an auto attendant platform.

FIG. 2 is a simplified block diagram of one preferred implementation of the present invention. In this embodiment, an auto attendant platform 10 is located within a private branch exchange (PBX). Platform 10 comprises a switch 12, a controller 14, various applications, including an ASR application 16 such as Vpro/Continuous speech recognition, VR/Continuous speech recognition, or Speech-Wave Standard speech recognition, all available from Voice Control Systems, Inc. of Dallas, Tex. Of course, any given speech recognition application may be used. The platform also includes a voice mail application 18 for storage, retrieval and forwarding of voice messages.

The attendant provides various operator services functions. Thus, for example, the attendant answers an incoming call, plays an opening greeting, solicits a name/extension, and transfers the call to that extension. When the attendant answers a call, outside callers typically are prompted for a name. Upon confirmation of the name, a given outside caller is transferred to the corresponding extension. In the known art, the attendant typically outputs a "did you say" prompt to facilitate name confirmation. Users of the system usually have access to the voice mail system for the purpose of recording and re-recording their "did you say" prompt.

According to the present invention, the auto attendant platform further includes a natural names library 25. Library 25 preferably is a database of compressed audio files 27, with each file preferably corresponding to an object to be recognized by the ASR. Thus, in the voice mail example, which is merely representative, the files 27 comprise a massive collection of common names. Preferably, the collection is generated in an off-line manner, by computer entry (type-in), spoken input (say-in), or some combination of both. When the library is made available to the attendant, preferably the common names have already been recorded, compressed, stored and indexed for acquisition by the ASR application. Taking the example of a names database, a given name may have a set of one or more transcriptions, which is a phonetic spelling of the name. This is especially desirable where a given name may have different pronunciations due to differences in dialects, local speech patterns, speaker origin, and the like. Thus, according to the invention, a given common name, e.g., "Smith" might be identified by a set of object instances, each reflecting a different pronunciation of the name.

Off-line creation and storage of common names in the library 25 obviates user entry of his or her name for the "did you say" prompt and other such prompts used by the system. If a given user does not record his or her name for his or her associated mailbox, the system can still return a natural sounding spoken response (in particular, the user's name) without resort to text-to-speech processing.

In one embodiment, the audio files comprising the name objects are stored as compressed files (e.g., .wav files). The particular compression technique is not a limitation of the invention, however. Thus, the compression may be based on adcpm, pcm, $\mu$law, alaw, or any other known or later developed compression routine. In addition, the particular files may be arranged in any convenient format including, for example, as an array, a linked list, or the like. Preferably, as the library is enlarged in size, a relational database management system (RDBMS) is used to manage storage, retrieval and serving of the files comprising the library. In one embodiment, the audio files are stored in a relational database that includes a directory service (e.g., LDAP) as a front end. This enables the library to be accessed via a computer network such as the Internet or an intranet. The relational database may be supplied from Oracle, Sybase or any other third party vendor.

Figure 3:
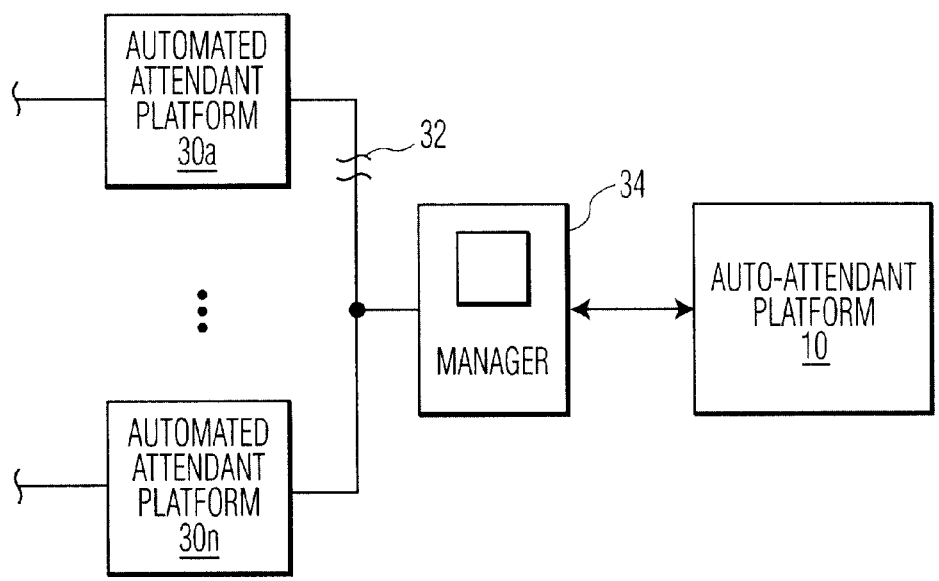
FIG. 3 is a simplified block diagram of an alternate implementation wherein the natural names library is centrally managed and accessible by a set of attendant platforms.

A large distributed application of this invention is illustrated in FIG. 3. In this embodiment, a set of automated attendant platforms 30a–30n selectively access the library through a directory server. The platforms 30 access the directory server via a computer network 32. A manager 34, which may be a server computer, controls and administers access to the library.

Figure 4:
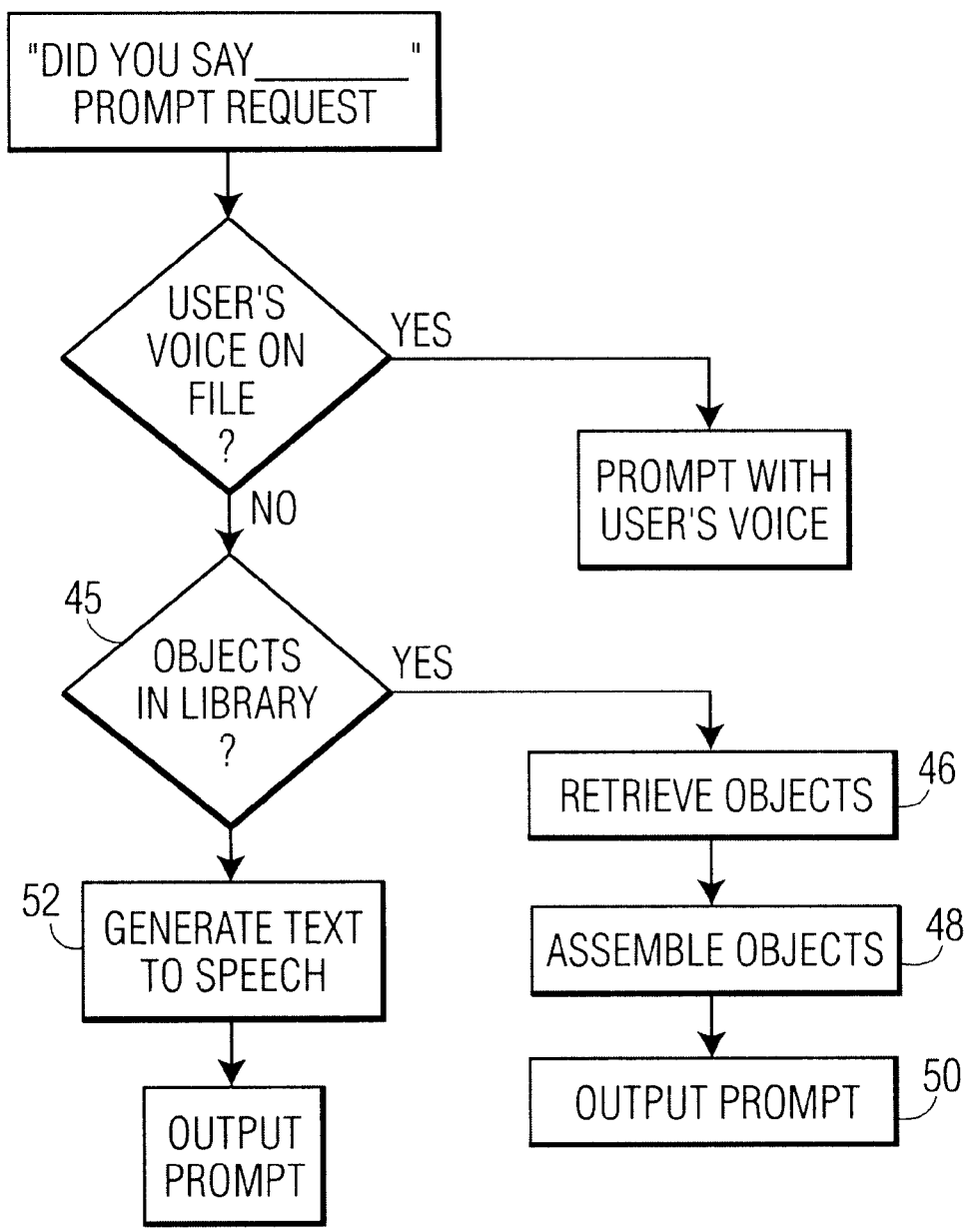
FIG. 4 is a simplified flowchart of a speech playback routine in which the names library is selectively accessed.

FIG. 4 is a simplified flowchart of a speech playback routine in which the names library is selectively accessed. The routine begins at step 40 when it is required to issue the "did you say" prompt. One of ordinary skill will appreciate, however, that this example is merely illustrative and that the library may be accessed for any number of other prompts or purposes within the scope of the present invention. At step 42, a test is performed to determine whether the prompt can be filled with an audio file in the user's own voice. If so, the routine continues at step 44 to issue the prompt with the user's prerecorded name. If, however, the outcome of the test at step 42 is negative, the routine continues at step 45 to test whether objects comprising the desired name are available in the library. If so, the routine continues at step 46 to retrieve a set of one or more objects from the names library. As noted above, the names library may be associated with the platform or remotely accessible by the platform (e.g., over a computer network). During the retrieval step, the routine may also parse a set of object transcriptions (for a given name) to ensure that a given pronunciation for the name is used. At step 48, the objects are assembled as necessary. Typically, this step involves concatenation of a first name and a last name (in the case of voice mail). At step 50, the assembled constituents are output in the prompt.

If the outcome of the test at step 45 is negative, which indicates that one or more of the necessary name objects are not available from the names library, then the routine continues at step 52 to generate a text-to-speech version of the name. At step 54, the routine outputs the "did you say" prompt, using the text-to-speech processor. As can be seen, however, the text-to-speech process is only used as a last resort where either the user or the names library cannot supply the necessary audio files to complete the prompt.

According to the present invention, the names library, or some subset thereof, is made available to the auto attendant as necessary. Thus, a set of objects (corresponding to a set of proper names) is made available to a given first attendant that provides voice mail functionality while a second set of objects (corresponding to a set of product names) is made available to an speech-based order entry and confirmation system. As one of ordinary skill will appreciate, the particular application of this invention is not limited to voice mail, to order entry, or the like. As the nammes library grows in size, there will be many different applications that can benefit from the natural names library.

The control routines that provide the functionality of FIG. 4 are preferably implemented in computer software. Thus, one of the preferred implementations of the invention is as a set of instructions (program code) in a code module resident in the random access memory of a general purpose computer. Until required by the computer, the set of instructions may be stored in another computer memory, e.g., in a hard disk drive or in a removable memory such as an optical disk (for eventual use in a CD ROM) or a floppy disk (for eventual use in a floppy disk drive), or downloaded via the Internet or some other computer network. In addition, although the various methods described are conveniently implemented in a computer selectively activated or reconfigured by software, one of ordinary skill in the art would also recognize that such methods may be carried out in hardware, in firmware, or in more specialized apparatus or devices constructed to perform the required method steps.

Having thus described my invention, what I claim as new and desire to secure by letters patent is set forth in the following claims:

What is claimed is:

1. In an automated attendant having a processor and means for answering a telephone, for playing a greeting, for soliciting a name, for confirming a spoken input, and for transferring a caller to a given extention, the improvement comprising:
   a natural names library in which a large number of object audio files are stored, each of the object audio files representing a name; and
   control means operative by the processor and responsive to a request to confirm a spoken input for (a) determining whether the spoken input identifies a user who has recorded his or her name, (b) for selectively retrieving a set of one or more objects from the natural names library if the outcome of the determination is negative, and (c) for outputting the set of one or more objects.

2. The improvement as described in claim 1 wherein the step of outputting the set of one or more objects includes the step of assembling at least first and second objects into a string.

3. The improvement as described in claim 2 wherein the first and second objects are assembled by concatenation.

4. The improvement as described in claim 3 wherein the first and second objects are a first name and last name of a called party.

5. The improvement as described in claim 1 wherein the control means further includes generating a text-to-speech version of the spoken input by phonetically spelling the spoken input for addition to the natural names library if a given object is not available from the natural names library.

6. The improvement as described in claim 1 wherein the audio files are stored in a compressed format in the natural names library.

7. A system, comprising:
   at least one auto attendant comprising a processor and means for answering a telephone, for playing a greeting, for soliciting a name, for confirming a spoken input, and for transferring a caller to a given extention;
   a natural names library in which a large number of object audio files are stored, each of the object audio files representing a name; and
   control means responsive to a request to confirm a spoken input for (a) determining whether the spoken input identifies a system user who has recorded his or her name, (b) for selectively retrieving a set of one or more objects from the natural names library if the outcome of the determination is negative, and (c) for outputting the set of one or more objects.

8. The system as described in claim 7 wherein the step of outputting the set of one or more objects includes the step of assembling at least first and second objects into a string.

9. The system as described in claim 8 wherein the first and second objects are assembled by concatenation.

10. The system as described in claim 7 wherein the natural names library is located remotely from an auto attendant and is accessed via a computer network.

11. The system as described in claim 7 wherein the natural names library is located remotely from the auto attendant and is accessed via a computer network.

12. The system as described in claim 7 further including at least a second auto attendant, wherein the natural names library is shared by the first and second auto attendants.

13. The system as described in claim 7 wherein the audio files are stored in the natural names library in compressed form.

14. A method of confirming a spoken input, comprising the steps of:
   responsive to a request to confirm the spoken input, determining whether a user has prerecorded his or her name;
   if the user has prerecorded his or her name, confirming the spoken input using the user's prerecorded name;
   if the user has not prerecorded his or her name, determining whether the spoken input can be confirmed using information available from a natural names library of common name objects;
   if the spoken input can be confirmed using the information, retrieving a set of one or more objects from the natural names library; and
   outputting a given name derived from the set of objects.

15. The method as described in claim 14 wherein the step of outputting the given name further includes the step of assembling the given name from at least first and second objects.

16. The method as described in claim 15 wherein the first and second objects are assembled by concatenation.

17. The method as described in claim 14 further including the steps of:
   generating a text-to-speech version of the spoken input by phonetically spelling the spoken input for addition to a natural names library if the spoken input cannot be confirmed using information available from the natural names library of common name objects, and
   outputting the text to speech version.

18. The method as described in claim 14 wherein at least one of the objects has a set of associated object instances each representing a given pronunciation of a name.

* * * * *